United States Patent
Scicchitano

(10) Patent No.: US 12,077,240 B2
(45) Date of Patent: Sep. 3, 2024

(54) HANDLEBAR WITH DIRECTIONAL PERFORMANCE CHARACTERISTICS

(71) Applicant: Fox Factory, Inc., Duluth, GA (US)

(72) Inventor: Bart Scicchitano, Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/583,042

(22) Filed: Jan. 24, 2022

(65) Prior Publication Data

US 2022/0234676 A1 Jul. 28, 2022

Related U.S. Application Data

(60) Provisional application No. 63/142,279, filed on Jan. 27, 2021.

(51) Int. Cl.
*B62K 21/12* (2006.01)

(52) U.S. Cl.
CPC .................... *B62K 21/12* (2013.01)

(58) Field of Classification Search
CPC ....... B62K 21/12; B62K 21/26; B62K 21/145
USPC ........................................... 74/551.1
See application file for complete search history.

(56) References Cited

U.S. PATENT DOCUMENTS

| | | | | |
|---|---|---|---|---|
| 4,503,729 A | * | 3/1985 | Shimano | B62K 21/12 D12/178 |
| 5,117,708 A | * | 6/1992 | Boyer | B62K 21/12 74/551.6 |
| 10,036,443 B2 | | 7/2018 | Galasso et al. | |
| 10,435,106 B2 | | 10/2019 | Galasso et al. | |
| 11,352,093 B2 | * | 6/2022 | Staples | B62K 21/26 |
| 2005/0257640 A1 | | 11/2005 | Addink et al. | |
| 2007/0175292 A1 | * | 8/2007 | Nicol | B62K 21/12 74/551.1 |
| 2010/0186542 A1 | * | 7/2010 | Hashimoto | B62K 21/12 29/527.1 |
| 2011/0088967 A1 | * | 4/2011 | Tabata | F01N 3/06 181/231 |
| 2016/0185414 A1 | * | 6/2016 | Watt | B62K 21/04 280/279 |
| 2020/0130772 A1 | * | 4/2020 | Brown, IV | B62K 21/02 |
| 2020/0130773 A1 | | 4/2020 | Brown, IV et al. | |

(Continued)

FOREIGN PATENT DOCUMENTS

| | | | | |
|---|---|---|---|---|
| CN | 105730594 A | * | 7/2016 | ............ B62K 19/32 |
| CN | 107972785 A | | 5/2018 | |
| DE | 19629740 A1 | * | 1/1998 | ............ B62K 19/00 |

(Continued)

OTHER PUBLICATIONS

Define angle, Microsoft Bing, Nov. 19, 2022 (Year: 2022).*

(Continued)

*Primary Examiner* — Vinh Luong

(57) ABSTRACT

A handlebar with directional performance characteristics is disclosed. The handlebar includes a stem clamp region, a plurality of control end regions, and a plurality of transition regions. A cross-section of at least a portion of one or more of the plurality of transition regions includes an asymmetric cross-section based on an intersection of plurality of ellipses and defined by four different radii R1, R2, R3, R4 and an angle ($\alpha$) of an axis of symmetry of said ellipses, wherein said plurality of ellipses have coincident centers.

38 Claims, 7 Drawing Sheets

(56) References Cited

U.S. PATENT DOCUMENTS

2021/0291930 A1    9/2021  Staples
2023/0020325 A1*   1/2023  Brown, IV ............. B62K 21/04

FOREIGN PATENT DOCUMENTS

| DE | 102007012267 A1 |   | 9/2008  |                 |
|----|-----------------|---|---------|-----------------|
| DE | 202019104712 U1 |   | 12/2020 |                 |
| EP |      1880935 A2 | * | 1/2008  | ............. B62K 21/12 |
| EP |      4035982 A1 | * | 8/2022  | ............. B62K 21/12 |
| FR |      2868388 A1 | * | 7/2005  | ............. B62K 21/12 |

OTHER PUBLICATIONS

Ellipse, Wikipedia, Oct. 21, 2022 (Year: 2022).*
Difference between Circle and Ellipse, k6-geometric-shapes.com, allmathwords.org., Microsoft Bing, Nov. 19, 2022 (Year: 2022).*
Translation of CN 105730594A, Watt et al., Jul. 6, 2016 (Year: 2016).*
European Search Report for EP Application No. 22153713.7, 10 pages, Mailed Jun. 17, 2022.
Fries, "Rhythms For Cognition: Communication Through Coherence", Oct. 7, 2015, 35 Pages.
Taiwanese First Office Action, Application No. 111103666, 15 Pages, Mailed Nov. 2, 2022.

* cited by examiner

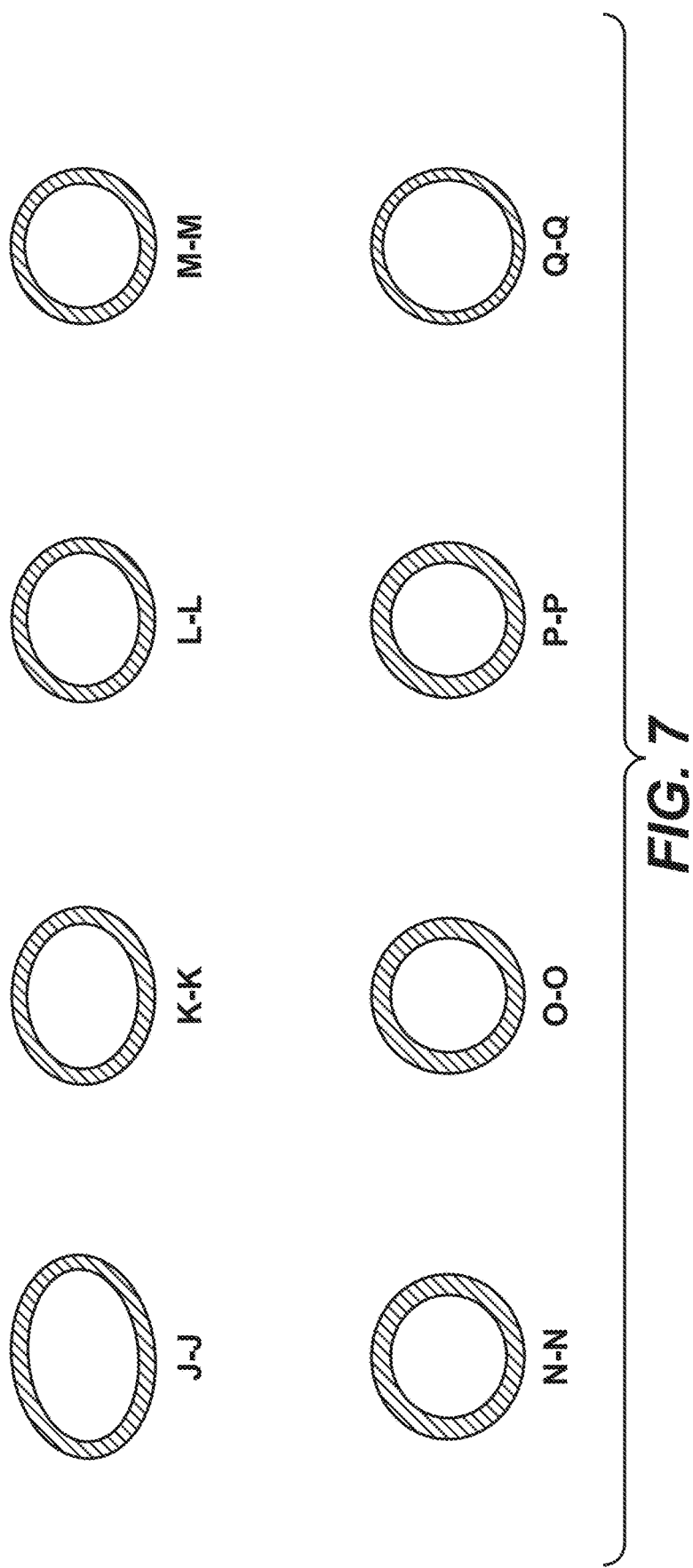

HANDLEBAR WITH DIRECTIONAL PERFORMANCE CHARACTERISTICS

CROSS REFERENCE

This application Claims priority to and benefit of co-pending U.S. Provisional Patent Application No. 63/142,279 filed on Jan. 27, 2021, entitled "Bicycle Handlebar With Directional Performance Characteristics" by Bart Scicchitano and assigned to the assignee of the present application, the disclosure of which is hereby incorporated herein by reference in its entirety.

FIELD OF THE INVENTION

Embodiments of the invention generally relate to steering components such as handlebars.

BACKGROUND

Typically, a handlebar is used for steering a vehicle. Normally, the movement of the handlebar results in a change to the direction of travel for the vehicle. On a ground (or water) vehicle, the movement of the handlebar will usually result in a turn to the left or the right. In an air vehicle, the movement of the handlebar can result in a change to one or more of a roll, a pitch, and possibly even a yaw.

BRIEF DESCRIPTION OF THE DRAWINGS

Aspects of the present invention are illustrated by way of example, and not by way of limitation, in the accompanying drawings, wherein:

FIG. 7 includes a plurality of cross-section views including cross-sections J-J through Q-Q of FIG. 3, in accordance with an embodiment.

Figure 1:
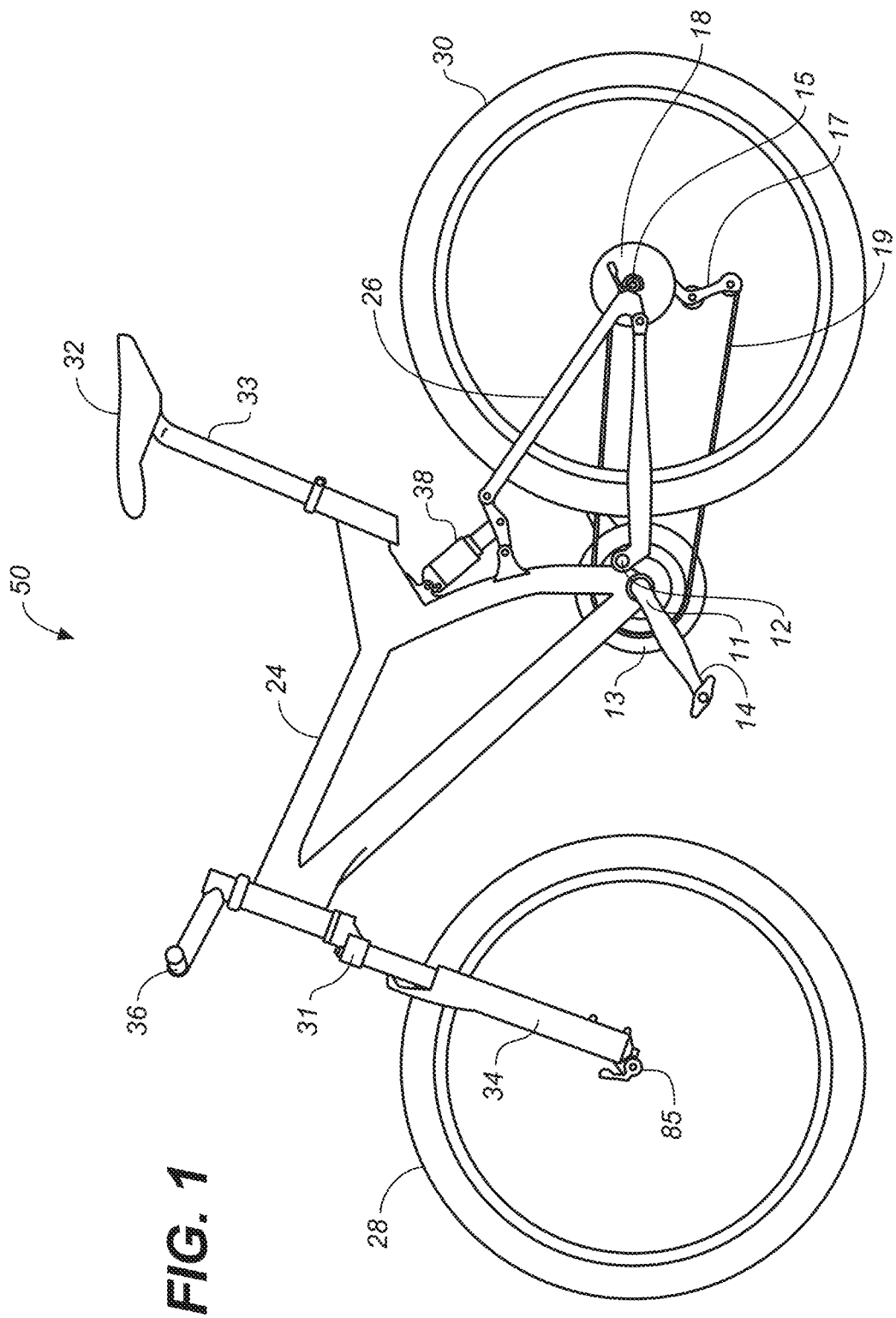
FIG. 1 is a perspective view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

User experience is often heavily influenced by the dynamic response and structural properties of a handlebar. In some embodiments, the dynamic response (resonant frequency and damping ratio) and structural properties (stiffness and strength) for optimal user experience are not isotropic, but are instead specific to different planes of the handlebar (fore-aft plane and vertical plane, etc.). Embodiments disclosed herein adjust the asymmetry of at least a portion of a handlebar (as identified by an asymmetric cross-section) in response to various frequencies imparted to the handlebar while maintaining appropriate structural properties for the handlebar. In one embodiment, the asymmetric cross-section(s) of the handlebar are configured to reduce and/or change vibrational and/or resonant frequencies that would otherwise be transferred from the handlebar to a user during travel.

In one embodiment, the asymmetric cross-section(s) of the handlebar are configured to modify the aerodynamic profile of the handlebar to reduce air resistance during high-speed travel. For example, a circular cross-section of a stem clamp region of the handlebar can negatively affect the aerodynamic characteristics of the handlebar. Moreover, handlebars with circular cross-section stem clamp regions tend to rotate in a stem clamp, which may cause a crash. In one embodiment, the asymmetric cross-section(s) of the handlebar stem clamp region are configured to reduce and/or prevent the rotation of the handlebar in the stem clamp thereby improving the user's safety and comfort.

In one embodiment, the asymmetric cross-section(s) of the handlebar are configured for one or both control end regions of the handlebar, which allows for a positioning of bicycle controls (brakes, grips, gear shifters, etc.) in a way that improves the user's comfort and prevents user fatigue. For example, a circular cross-section at a control end region can allow the vehicle controls mounted thereto to rotate on the handlebar contributing to the rider's fatigue and causing potential danger of a crash. In one embodiment, by configuring at least a portion of the cross-section profile of one or both control end regions of the handlebar to be asymmetric cross-section(s), the rotation of the bicycle controls on the handlebar can be reduced and/or completely eliminated.

In one embodiment, the one or more uniquely defined asymmetric cross-sections in one or more different regions of the handlebar are configured to create different dynamic response and structural properties in multiple planes (e.g., a fore-aft plane, a vertical (or side-to-side) plane, both the fore-aft and vertical plane, etc.).

In one embodiment, the one or more uniquely defined asymmetric cross-sections in one or more different regions of the handlebar are not symmetric oval shapes as they would not meet the desired geometric constraints of the handlebar, e.g., the required upsweep and/or backsweep, smooth transitions between sections of the handlebar, and the like. Instead, as disclosed herein the one or more uniquely defined asymmetric cross-sections in one or more different regions of the handlebar are configured to provide improvements to normal handlebar aerodynamic characteristics as well as user safety and comfort.

In the following discussion, and for purposes of clarity, a bicycle is utilized as the example vehicle. However, in another embodiment, the handlebar could be used on one or more of a variety of vehicles such as, but not limited to, a bicycle, an electric bike (e-bike), a moped, a motorcycle, a snow machine, a personal watercraft (PWC), aircraft, or any vehicle that utilizes a bar style steering assembly, e.g., a stick in an aircraft, a U or W shaped aircraft steering assembly, etc.

Referring now to FIG. 1, a perspective view of a bicycle 50 is shown in accordance with an embodiment. In one embodiment, bicycle 50 has a frame 24 with a suspension system comprising a swing arm 26 that, in use, is able to move relative to the rest of frame 24; this movement is permitted by, inter alia, rear shock assembly 38. The front fork assembly 34 also provide a suspension function via a shock assembly in at least one fork leg.

In one embodiment, bicycle 50 is a full suspension bicycle. In another embodiment, bicycle 50 has only a front suspension and no rear suspension (e.g., a hard tail). In different embodiments, bicycle 50 could be a road bike, a mountain bike, a gravel bike, an electric bike (e-bike), a hybrid bike, a motorcycle, or the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and crank assembly 13. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 34 via axle 85. In one embodiment, front fork assembly 34 includes a crown 31. In one embodiment, a portion of front fork assembly 34 (e.g., a steerer tube) passes through the frame 24 and couples with handlebar 36. In so doing, the front fork assembly and handlebars are rotationally coupled with the frame 24 thereby allowing the rider to steer the bicycle 50.

In one embodiment, bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

In one embodiment, bicycle 50 is driven by a chain 19 that is coupled with both crank assembly 13 and rear sprocket 18. As the rider pedals, the rotational input to crank arms 100 cause the crank assembly 13 to rotate about bottom bracket axis 11. This rotation applies a force to chain 19 which transfers the rider generated rotational energy to rear sprocket 18 which results in the rotation of rear wheel 30. Chain tension device 17 provides a variable amount of tension on chain 19. The need for chain 19 length variation can be due to a number of different gears that may be on one or both of crank assembly 13 and rear sprocket 18 and/or changes in chain stay length as the distance between bottom bracket axis 11 (where crank assembly 13 attaches to frame 24) and the rear axle 15 changes due to suspension articulation.

In one embodiment, saddle 32 is connected to the frame 24 via seatpost 33. In one embodiment, seatpost 33 is a dropper seatpost.

In one embodiment, bicycle 50 may include one or more active suspension components, sensors, and the like, such as disclosed in U.S. Pat. No. 10,036,443 which is incorporated by reference herein, in its entirety.

Figure 2:
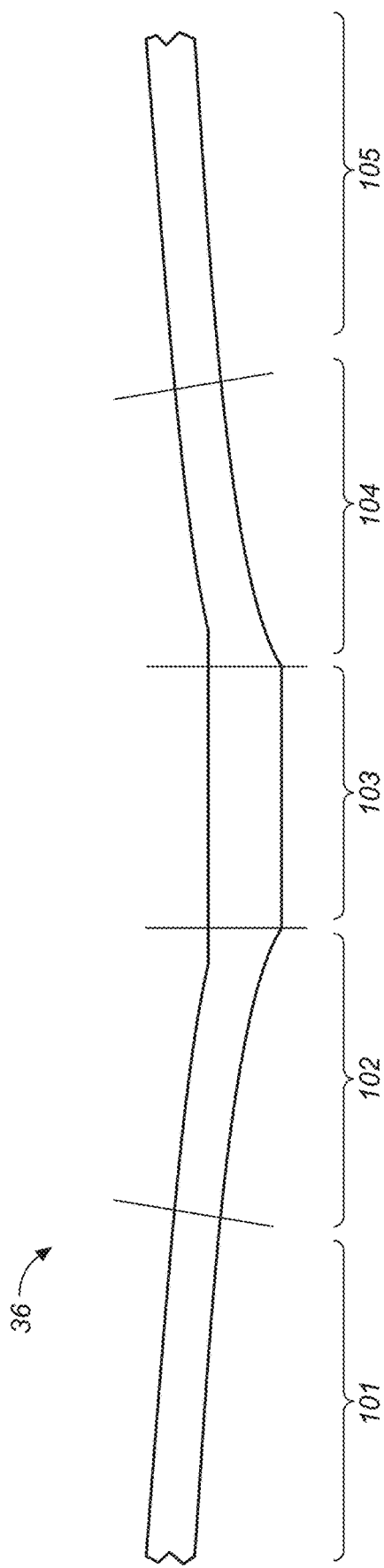
FIG. 2 is a front view of a handlebar, in accordance with an embodiment.

With reference now to FIG. 2, a front view of handlebar 36 is shown in accordance with an embodiment. In one embodiment, handlebar 36 is broken down into a number of subsections, e.g., 101-105. In one embodiment, handlebar 36 consists of stem clamp region 103, two transition regions (e.g., transition region 102 and transition region 104), and two control end regions (e.g., control end region 101 and control end region 105).

In one embodiment, handlebar 36 is attached to bicycle 50 via a handlebar stem clamped at stem clamp region 103.

In one embodiment, controls and components such as, but not limited to, brake levers, grips, throttle, gear shifter, and the like are coupled to the handlebar 36 at one or both of control end regions (e.g., control end region 101 and control end region 105). In one embodiment, the layout of the controls and components at one or both of control end regions (e.g., control end region 101 and control end region 105) is defined by the manufacturer. In one embodiment, the layout of one or more of the controls and components at one or both of control end regions (e.g., control end region 101 and control end region 105) is arranged by the user.

In one embodiment, handlebar 36 comprise a material such as an aluminum alloy, a titanium alloy, steel, other metal alloys, metals, ceramic, or the like. In one embodiment, some of the components of handlebar 36 comprise a composite material such a composite material with a thermoset or thermoplastic matrix, a long or short fiber thermoplastic or thermoset composite, injection molded carbon fiber, carbon fiber reinforced nylon, carbon fiber reinforced epoxy resin, glass filled nylon, a compression molded material, composite layering, chopped carbon fibers, plastic, a polymer, long fiber-reinforced plastics, short-fiber reinforced plastics, or the like. In one embodiment, one, some, or all of the components of handlebar 36 could be formed from a combination of these materials, e.g., a composite/metal hybrid. The handlebar assembly can be manufactured by a variety of methods such as compression molding, bladder molding, vacuum molding, resin transfer molding (RTM), filament winding, automated fiber placement (AFP), automated tape laying (ATL), or the like.

In one embodiment, the cross-section of at least a portion of the stem clamp region 103 is asymmetric while the cross-section of one or both of the control end regions (e.g., control end region 101 and/or control end region 105) and one or both of the transition regions (e.g., transition region 102 and/or transition region 104) are symmetric.

In one embodiment, the cross-section of at least a portion of one or both of the control end regions (e.g., control end region 101 and/or control end region 105) is asymmetric while the cross-section of both the stem clamp region 103 and one or both of the transition regions (e.g., transition region 102 and/or transition region 104) are symmetric.

In one embodiment, the cross-section of at least a portion of one or both of the transition regions (e.g., transition region 102 and/or transition region 104) is asymmetric while the cross-section of both the stem clamp region 103 and one or both of the control end regions (e.g., control end region 101 and/or control end region 105) are symmetric.

In one embodiment, the cross-section of at least a portion of one or both of the control end regions (e.g., control end region 101 and/or control end region 105) and one or both of the transition regions (e.g., transition region 102 and/or transition region 104) are asymmetric while the cross-section of the stem clamp region 103 is symmetric.

In one embodiment, the cross-section of at least a portion of the stem clamp region 103 and at least a portion of one or both of the control end regions (e.g., control end region 101 and/or control end region 105) are asymmetric while the cross-section of one or both of the transition regions (e.g., transition region 102 and/or transition region 104) are symmetric.

In one embodiment, the cross-section of at least a portion of the stem clamp region 103 and at least a portion of one or both of the transition regions (e.g., transition region 102 and/or transition region 104) are asymmetric while the cross-section of one or both of the control end regions (e.g., control end region 101 and/or control end region 105) are symmetric.

In one embodiment, the cross-section of at least a portion of the stem clamp region 103, at least a portion of one or both of the control end regions (e.g., control end region 101 and/or control end region 105), and at least a portion of one or both of the transition regions (e.g., transition region 102 and/or transition region 104) are asymmetric.

In one embodiment, the cross-section of at least a portion of the stem clamp region 103, at least a portion of both control end regions (e.g., control end region 101 and control end region 105), and at least a portion of both of the transition regions (e.g., transition region 102 and transition region 104) are asymmetric.

As a result, embodiments of the handlebar 36 comprising at least a portion of asymmetric cross-section(s) are able to reduce and/or change the vibrations or other unwanted effects imparted to a vehicle user based on the conditions that the vehicle and/or handlebar 36 is experiencing.

In various embodiments of the present invention, handlebar 36 comprising at least a portion of asymmetric cross-section(s) "translates" the vibration that will be transferred to the user. That is, by adjusting the non-uniformity of the asymmetric cross-section(s), handlebar 36 alters the frequencies (makes the frequencies higher or lower) that are ultimately passed to the vehicle user. It should be further noted that in various embodiments, where it is desired to reduce the amplitude of a particular frequency, handlebar 36 reduces the vibration that will be transferred to the user by adjusting the non-uniformity of the asymmetric cross-section(s). Conversely, it should be further noted that in various embodiments, where it is desired to increase the amplitude of a particular frequency, handlebar 36 amplifies the vibration by adjusting the non-uniformity of the asymmetric cross-section(s).

Although embodiments of the handlebar 36 explicitly describe adjusting the non-uniformity of the asymmetric cross-section(s), various other embodiments of the present invention adjust the response and operation of the handlebar 36 by varying the material comprising at least a portion of the handlebar 36. It should further be noted that the present invention also includes embodiments is which the non-uniformity of the asymmetric cross-section(s) are adjusted, and the material comprising at least a portion of the handlebar 36 is varied.

Figure 3:
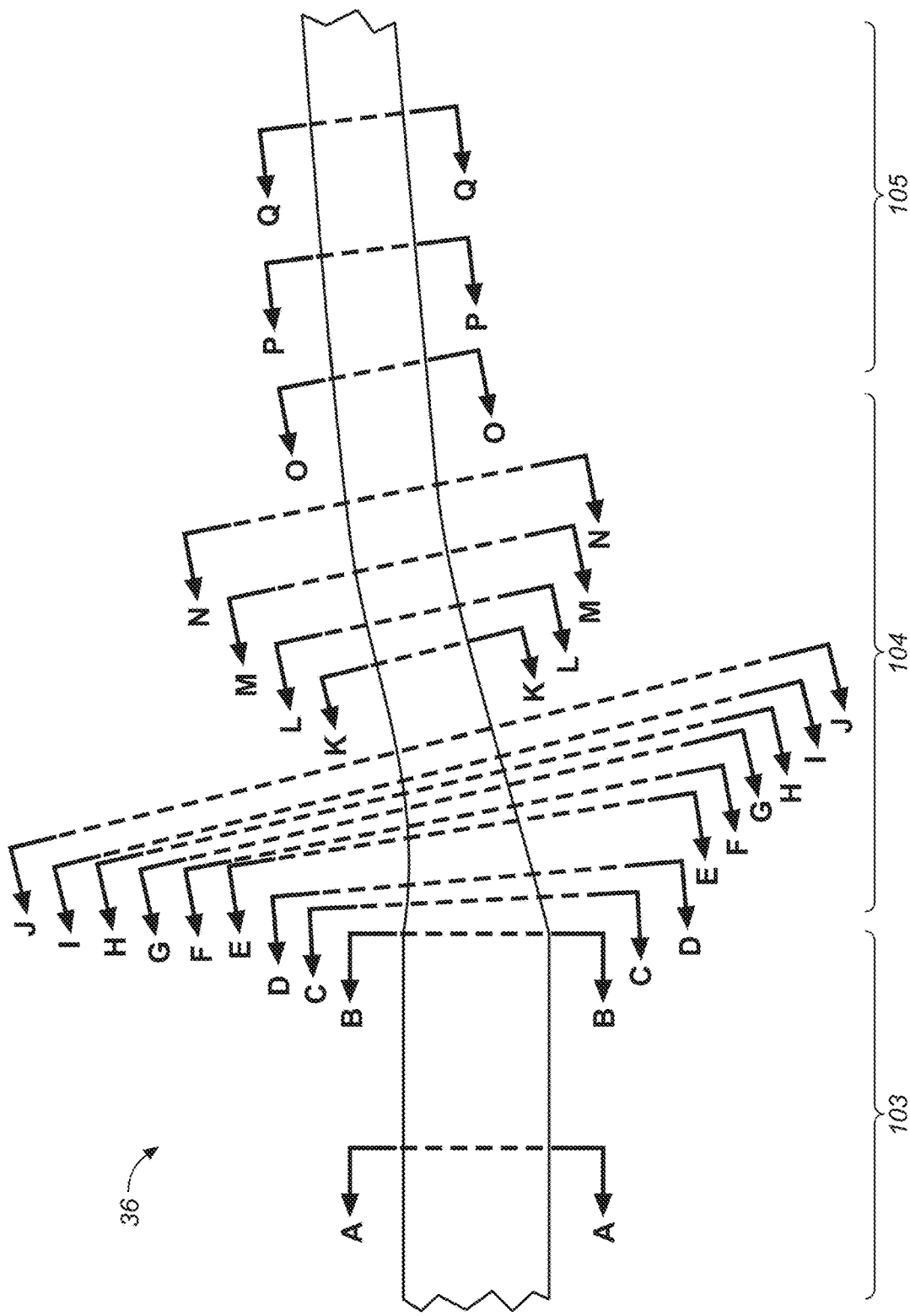
FIG. 3 is a front view of a portion of the handlebar of FIG. 2 with a number of cross-sections annotated thereon, in accordance with an embodiment.

Referring now to FIG. 3, a front view of a portion of the handlebar 36 of FIG. 2 with a number of cross-sections (e.g., cross-sections A-A through Q-Q) annotated thereon is shown in accordance with an embodiment.

In one embodiment, cross-sections A-A through Q-Q are not an axis-symmetric surface of revolution along the entire axial span of handlebar 36. That is, in various embodiments, cross-sections A-A through Q-Q of handlebar 36 are non-uniform at, at least, one location along the axial span of handlebar 36. Moreover, in embodiments of the present invention, the asymmetric cross-section(s) such as cross-sections A-A through Q-Q may be at any given location along the axial span of handlebar 36.

In one embodiment, the asymmetric cross-section(s) will be non-uniform along half the axial span of handlebar 36 beginning at approximately the middle of stem clamp region 103 and will be mirrored to the other half of the axial span of handlebar 36. Additionally, in one embodiment, the asymmetric cross-section(s) will be non-uniform along the entire axial span of handlebar 36.

In one embodiment, handlebar 36 will have a non-uniform asymmetric cross-section lengths at multiple locations along the axial span of handlebar 36. Furthermore, it should be noted, that in one embodiment, handlebar 36 may have a uniform asymmetric cross-section length at, at least, one location along the axial span of handlebar 36.

In one embodiment, stem clamp region 103 includes cross-sections A-A and B-B. In one embodiment, the transition region (e.g., transition region 102 and/or transition region 104) includes cross-sections C-C through N-N. In one embodiment, the end region (e.g., control end region 101 and/or control end region 105) includes cross-sections O-O through Q-Q.

With reference still to FIG. 3, in one embodiment, asymmetric cross-section(s) of handlebar 36 are oval in shape. In one embodiment, asymmetric cross-section(s) of handlebar 36 may be selected from shapes such as, but not limited to, egg-shaped, elliptically-shaped, rectangularly-shaped, other geometric shapes, and/or a combination of two or more different shapes. In one embodiment, asymmetric cross-section(s) of handlebar 36 are different thickness. Importantly, regardless of the various examples of shapes and configurations described herein, handlebar 36 has at least one asymmetric cross-section(s) at, at least, one location along the axial span of handlebar 36.

Figure 4:
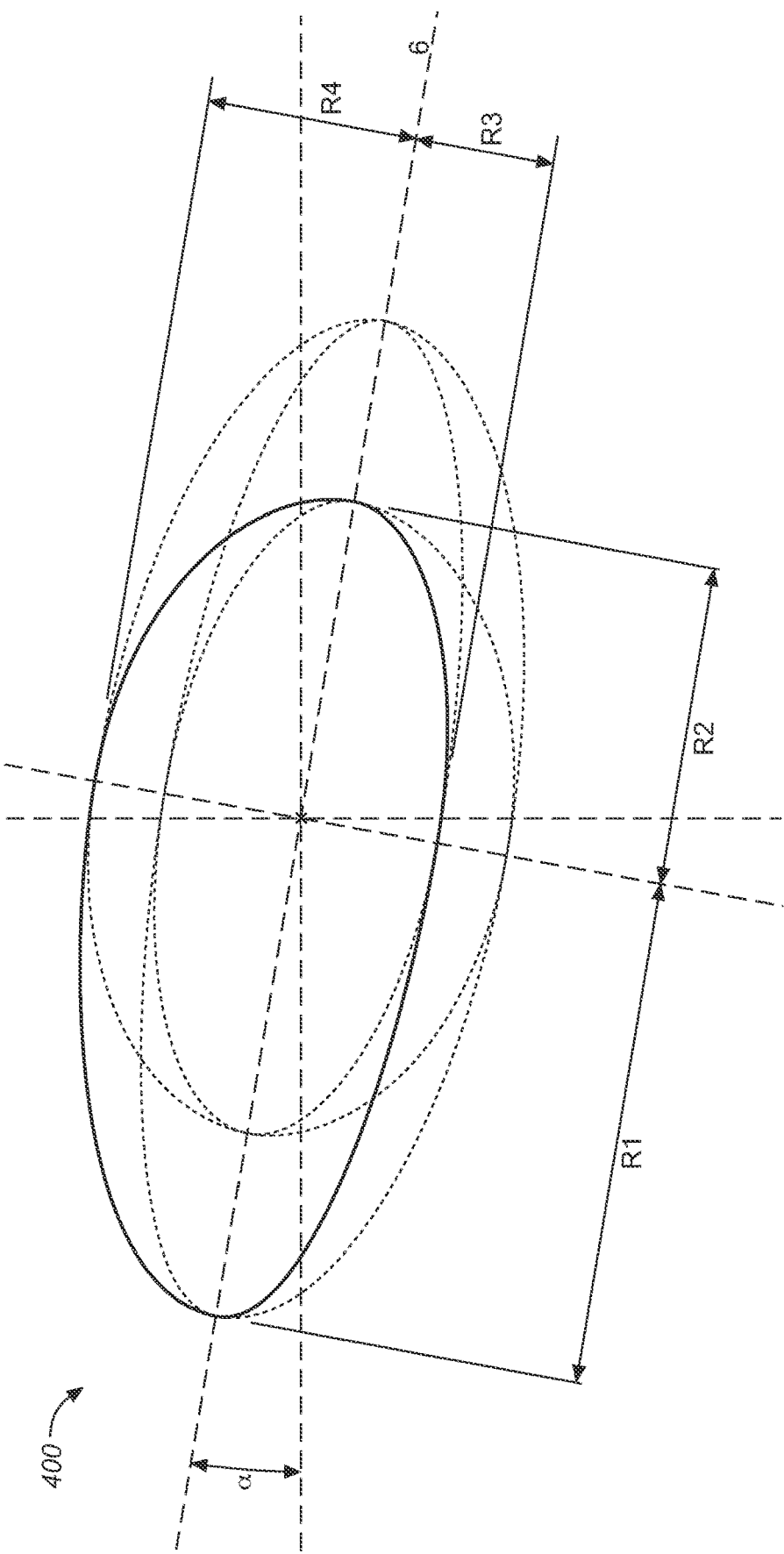
FIG. 4 is a perspective view of the different radial measurements and angles for one or more of the cross-sections of FIG. 3 in a first plane, in accordance with an embodiment.

With reference now to FIG. 4, a perspective view 400 of the different radial measurements and angles for one or more of the cross-sections of FIG. 3 in a first plane is shown in accordance with an embodiment. In one embodiment, perspective view 400 provides an example of a cross-section region of handlebar 36 formed by the intersection of 4 ellipses and defined by 4 radii (R1, R2, R3, R4) and interior of angle ($\alpha$) of axis 6 of symmetry of the ellipses. Although 4 ellipses are shown in FIG. 4, it should be appreciated that more or fewer ellipses may be used to generate each cross-section. The use of 4 ellipses is provided as one embodiment used to generate the desired shape for one or more of the given cross-sections.

Figure 5:
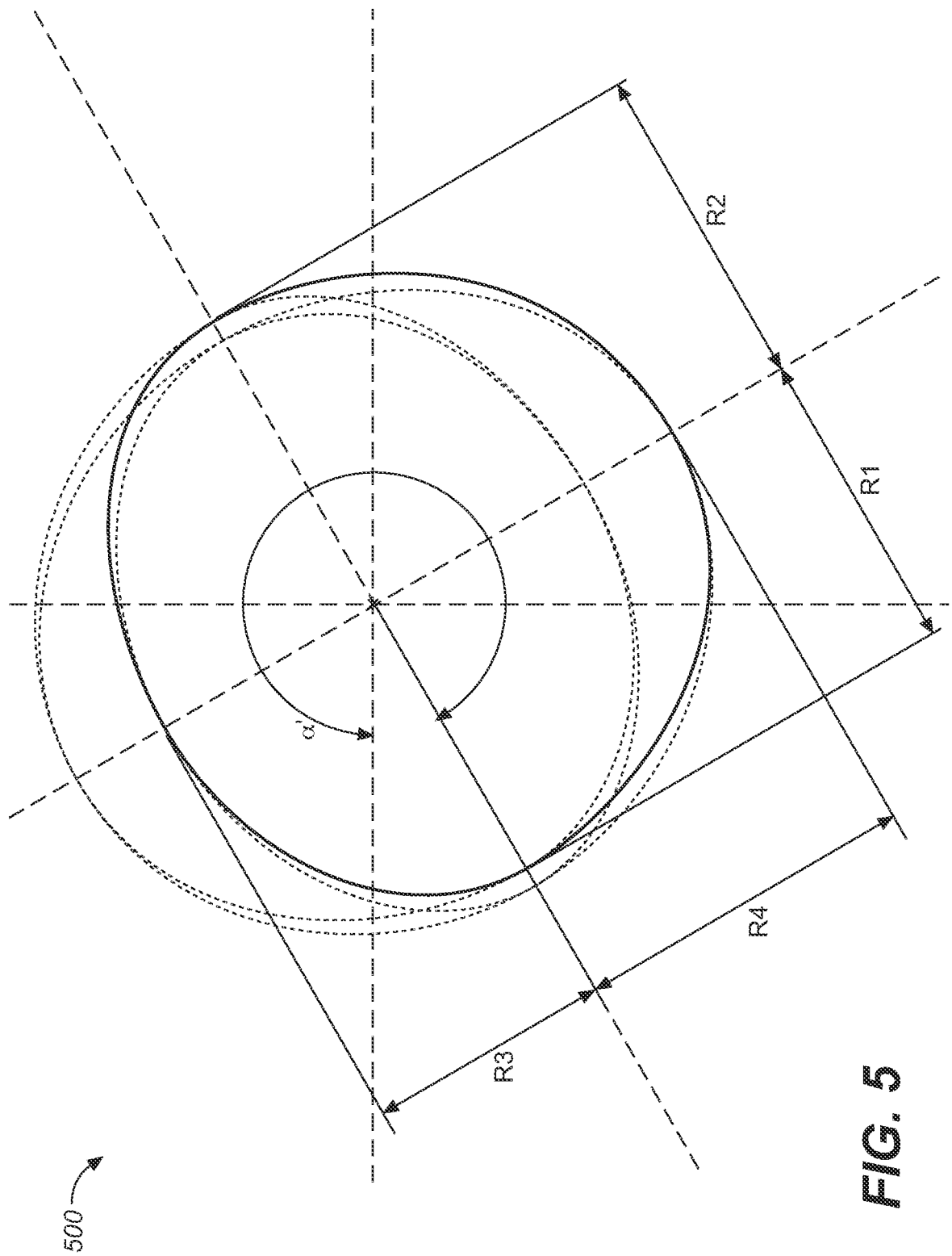
FIG. 5 is a perspective view of the different radial measurements and angles for one or more of the cross-sections of FIG. 3 in a second plane, in accordance with an embodiment.

Referring now to FIG. 5, a perspective view 500 of the different radial measurements and angles for one or more of the cross-sections of FIG. 3 in a second plane is shown in accordance with an embodiment. In one embodiment, perspective view 500 provides an example of a cross-section region of handlebar 36 formed by the intersection of 4 ellipses and defined by 4 radii (R1, R2, R3, R4) and exterior of angle ($\alpha'$) of axis of symmetry of the ellipses that is about a different axis than axis 6. Although 4 ellipses are shown in FIG. 5, it should be appreciated that more or fewer ellipses may be used to generate each cross-section. The use of 4 ellipses is provided herein as one embodiment used to generate the desired shape for one or more of the given cross-sections.

Figure 6:
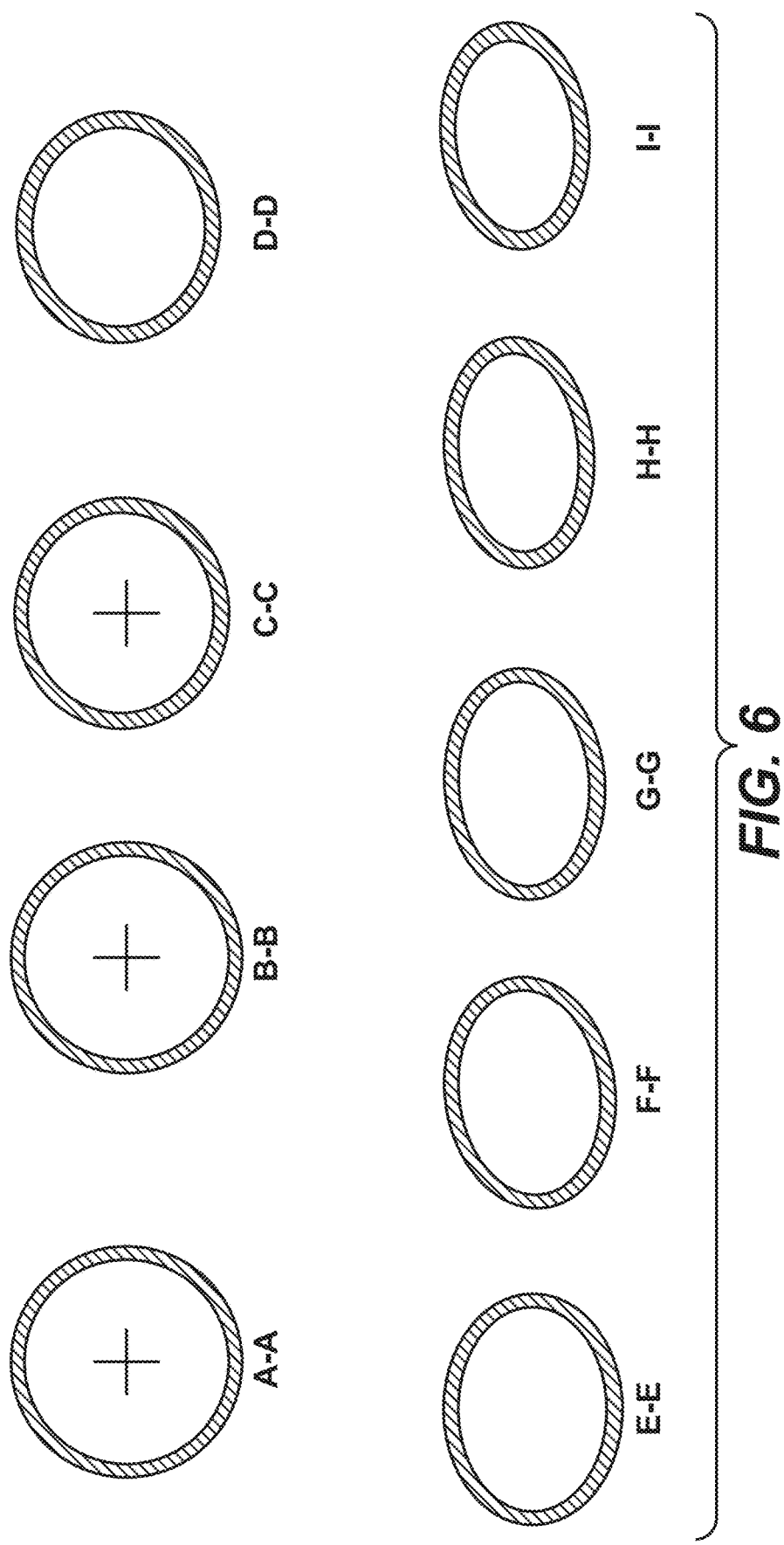
FIG. 6 includes a plurality of cross-section views including cross-sections A-A through I-I of FIG. 3, in accordance with an embodiment.

With reference now to FIG. 6, a plurality of cross-section views including cross-sections A-A through I-I of FIG. 3 are shown in accordance with an embodiment.

In one embodiment, stem clamp region 103 includes cross-sections A-A and B-B. In one embodiment, cross-sections A-A and B-B are both asymmetric. In one embodiment, cross-sections A-A is asymmetric and cross-section B-B is symmetric. In one embodiment, cross-sections A-A is symmetric and cross-section B-B is asymmetric. In another embodiment, the stem clamp region 103 may include other cross-sections such as cross-sections C-C through Q-Q.

Referring now to FIG. 6 and to FIGS. 3-5, in one embodiment, cross-sections A-A and B-B are formed by the intersection of 4 ellipses and defined by 4 radii (R1, R2, R3, R4) and angle (α) of axis (6) of symmetry of the ellipses.

In one embodiment, the shape of stem clamp region 103 provides a smooth transition (eliminating stress concentration in the handlebar 36) between stem clamp region 103 and transition regions (e.g., transition region 102 and transition region 104). In one embodiment, the shape of a cross-section of at least a portion of stem clamp region 103 is asymmetrically designed to improve the aerodynamic characteristics of the stem clamp region 103 of handlebar 36. In one embodiment, the shape of a cross-section of at least a portion of stem clamp region 103 is asymmetrically designed to reduce handlebar vibrations transferred to the user. In one embodiment, the shape of a cross-section of at least a portion of stem clamp region 103 is asymmetrically designed to reduce and/or prevent the rotation of the handlebar 36 within the stem clamp. In one embodiment, by reducing handlebar 36 vibration and/or preventing the rotation of handlebar 36 in the stem clamp, a user's safety and comfort is improved while steering feedback is maintained along with vehicle controllability.

In one embodiment, stem clamp region 103 uses R1≠R2≠R3≠R4 (e.g., asymmetric cross-section shape) with R1, R2, R3, R4 varying along the length of the region. In one embodiment, additionally, the angle (α) of axis (6) of symmetry of the ellipses can vary along the length of the stem clamp region 103. In one embodiment, since R1, R2, R3, R4 and α are varied along the length of stem clamp region 103, the dynamic response and structural properties of the handlebar 36 can be adjusted in multiple planes.

In one embodiment, control end regions (e.g., control end region 101 and control end region 105) and/or transition regions (e.g., transition region 102 and transition region 104) have R1=R2=R3=R4 (e.g., symmetric cross-section shape). In one embodiment, control end regions (e.g., control end region 101 and control end region 105) and/or transition regions (e.g., transition region 102 and transition region 104) have R1≠R2≠R3≠R4 (e.g., asymmetric cross-section shape).

Referring now to FIG. 7, a plurality of cross-section views including cross-sections J-J through Q-Q of FIG. 3 are shown in accordance with an embodiment.

Referring now to FIGS. 6 and 7, in one embodiment, transition regions (e.g., transition region 102 and/or transition region 104) include one or more of cross-sections C-C through N-N. In one embodiment, the transition regions (e.g., transition region 102 and transition region 104) may include other cross-sections such as cross-sections A-A through B-B and O-O through Q-Q.

Referring now to FIG. 3-7, in one embodiment, cross-sections C-C through N-N are formed by the intersection of 4 ellipses and defined by 4 radii (R1, R2, R3, R4) and angle (α) of axis (6) of symmetry of the ellipses.

In one embodiment, the asymmetric shape of the cross-sections of the transition regions (e.g., transition region 102 and transition region 104) use R1≠R2≠R3≠R4 (e.g., asymmetric cross-section shape) with R1, R2, R3, R4 varying along the length of the region to achieve a smooth transition (to eliminate stress concentration in the handlebar 36) between control end regions (e.g., control end region 101 and/or control end region 105) and stem clamp region 103. In one embodiment, the variations in cross-sections (including asymmetric cross-sections) across transition regions (e.g., transition region 102 and/or transition region 104) are designed to reduce handlebar vibrations transferred to the user thereby improving the user's comfort while retaining (or even enhancing) steering feedback and vehicle controllability.

In one embodiment, the angle (α) of the axis (6) of symmetry of the ellipses can vary along the length of the transition regions (e.g., transition region 102 and transition region 104). In one embodiment, as R1, R2, R3, R4 and α are varied along the length of the transition regions (e.g., transition region 102 and transition region 104) the dynamic response and structural properties of the handlebar can be adjusted in multiple planes.

In one embodiment, control end regions (e.g., control end region 101 and control end region 105) and/or stem clamp region 103 have R1=R2=R3=R4 (e.g., symmetric cross-section shape). In one embodiment, control end regions (e.g., control end region 101 and control end region 105) and/or stem clamp region 103 have R1≠R2≠R3≠R4 (e.g., asymmetric cross-section shape).

Referring again to FIG. 7, in one embodiment, control end regions (e.g., control end region 101 and/or control end region 105) include one or more of cross-sections O-O through Q-Q. In another embodiment, the control end regions (e.g., control end region 101 and control end region 105) may include other cross-sections such as cross-sections A-A through N-N.

Referring now to FIG. 7 and FIGS. 3-5, in one embodiment, cross-sections O-O through Q-Q are formed by the intersection of 4 ellipses and defined by 4 radii (R1, R2, R3, R4) and angle (α) of axis (6) of symmetry of the ellipses.

In one embodiment, the asymmetric shape of the cross-sections of the control end regions (e.g., control end region 101 and control end region 105) use R1≠R2≠R3≠R4 (e.g., asymmetric cross-section shape) with R1, R2, R3, R4 varying along the length of the region to achieve a smooth transition (to eliminate stress concentration in the handlebar 36) between transition regions (e.g., transition region 102 and/or transition region 104) and control end regions (e.g., control end region 101 and/or control end region 105). In one embodiment, the variations in the asymmetric cross-sections across control end regions (e.g., control end region 101 and/or control end region 105) are designed to reduce handlebar vibrations transferred to the user thereby improving the user's comfort while retaining (or even enhancing) steering feedback and vehicle controllability.

In one embodiment, the variations in the asymmetric cross-sections across control end regions (e.g., control end region 101 and/or control end region 105) are designed to prevent the rotation of one or more controls and components such as, but not limited to, brake levers, grips, throttle, gear shifter, and the like, attached to the control end regions (e.g., control end region 101 and/or control end region 105) thereby improving the user's safety.

In one embodiment, the angle (α) of the axis (6) of symmetry of the ellipses can vary along the length of the control end regions (e.g., control end region 101 and/or control end region 105). In one embodiment, as R1, R2, R3, R4 and a are varied along the length of the control end regions (e.g., control end region 101 and/or control end region 105) such that the dynamic response and structural properties of the handlebar 36 can be adjusted in multiple planes.

In one embodiment, transition regions (e.g., transition region 102 and transition region 104) and/or stem clamp region 103 have R1=R2=R3=R4 (e.g., symmetric cross-section shape). In one embodiment, transition regions (e.g., transition region 102 and transition region 104) and/or stem clamp region 103 have R1≠R2≠R3≠R4 (e.g., asymmetric cross-section shape).

Environment Induced Vibrational and/or Resonant Frequencies

In the various aforementioned embodiments of handlebar 36, the asymmetric cross-section(s) are selected to provide additional support for handlebar 36 at locations thereof which are subjected to greater stress. If it is determined that a particular type of use is subjecting a handlebar 36 to a "fore and aft" force which is greater than a "side-to-side" force, embodiments of the handlebar 36 comprising at least a portion of asymmetric cross-section(s) will adjust the non-uniformity of one or more asymmetric cross-section(s) to provide additional support with respect to the fore and aft force. Conversely, if it is determined that a particular type of use is subjecting handlebar 36 to a "side-to-side" force which is greater than a "fore and aft" force, embodiments of the handlebar 36 comprising at least a portion of asymmetric cross-section(s) will adjust the non-uniformity of one or more asymmetric cross-section(s) to provide additional support with respect to the side-to-side force.

In one embodiment, asymmetric cross-section(s) of handlebar 36 will be oriented such that the asymmetric cross-section(s) provide additional support with respect to an anticipated load. For example, in one embodiment, if it is anticipated that the vehicle will experience a fore and aft force/load, handlebar 36 is oriented such that the asymmetric cross-section(s) will provide additional support with respect to the fore and aft force.

As yet another example, in one embodiment, asymmetric cross-section(s) of handlebar 36 are adjusted in response to various frequencies that are expected to be imparted to handlebar 36. In one embodiment, handlebar 36 configures the asymmetric cross-section(s) such that fore and aft vibrational and/or resonant frequencies are reduced and/or changed. In another embodiment, handlebar 36 configures the asymmetric cross-section(s) such that side-to-side vibrational and/or resonant frequencies are reduced and/or changed. In another embodiment, handlebar 36 configures the asymmetric cross-section(s) such that aerodynamic drag is reduced and/or changed. In still another embodiment, handlebar 36 configures the asymmetric cross-section(s) such that fore and aft and side-to-side vibrational and/or resonant frequencies are reduced and/or changed. In still another embodiment, handlebar 36 configures the asymmetric cross-section(s) such that fore and aft and side-to-side vibrational and/or resonant frequencies are reduced and/or changed in conjunction with a reduction in aerodynamic drag.

As a result, embodiments of the handlebar 36 comprising at least a portion of asymmetric cross-section(s) are able to reduce and/or change the aerodynamics, vibrations, resonant frequencies, and/or other unwanted effects imparted to a vehicle user based on the conditions that the vehicle and/or handlebar 36 is experiencing.

Additional information regarding vibrations, resonant frequencies, and/or other unwanted effects can be found in U.S. Pat. No. 10,435,106, and U.S. patent application (Ser. No. 16/659,272) the contents of which are incorporated by reference herein, in their entirety.

Human Induced Vibrational and/or Resonant Frequencies

Pascal Fries, a German neurophysiologist with the Ernst Strüngmann Institute, has explored and studied the ways in which various electrical patterns, specifically, gamma, theta and beta waves, work together in the brain to produce the various types of human consciousness. His concept is communication through coherence (CTC) and it is based on interactions between different electrical oscillation rates. For example, gamma waves are typically defined as about 30 to 90 cycles per second (hertz), theta as a 4- to 7-Hz rhythm, and beta as 12.5 to 30 Hz. Thus, humans, in general, have a similar resonance or vibrational frequency.

Further, the resonance or vibrational frequency can vary depending upon the part of the body. For example, the head will normally have a resonance frequency between 20-30 Hz, the arm will normally have a resonance frequency between 5-10 Hz, and the hand will normally have a resonance frequency between 30-50 Hz.

CTC suggests that synchronized electrical oscillation rates work in harmony while out-of-synch electrical oscillation rates act detrimentally.

Thus, for example, in the example provided herein, the human hand has a resonance or vibrational frequency between 30-50 Hz, if the handlebar 36 is tuned to provide a coherent (or synchronized) resonance or vibrational frequency the system (e.g., user and handlebar) will work in harmony providing a feeling of interconnectivity, reducing stress and discomfort, thereby increasing endurance and the overall performance of the human body and mind.

In contrast, if the handlebar 36 is providing a resonance or vibrational frequency that is not in coherence (not-synchronized) with the resonance or vibrational frequency of the human hand, the system (e.g., user and handlebar) will be in discord reducing a feeling of interconnectivity and increasing stress and discomfort thereby reduced endurance and worsening the overall performance of the human body and/or mind.

As stated herein, there is a range of frequencies and further there is a difference between the resonance frequency of the arm (e.g., 5-10 Hz), the hand (e.g., 30-50 Hz), the head (e.g., 20-30 Hz), and or other human body parts.

As such, in one embodiment, the asymmetric cross-section(s) of handlebar 36 are adjusted in response to various human induced vibrational and/or resonant frequencies that are expected to be imparted to handlebar 36 by the user's interaction with the handlebar 36 and/or the vehicle they are operating.

For example, in one embodiment, handlebar 36 configures the asymmetric cross-section(s) such that vibrational and/or resonant frequencies produced by the handlebar 36 are synchronized with the human induced vibrational and/or resonant frequencies of the user's hand (e.g., 30-50 Hz). In another embodiment, handlebar 36 configures the asymmetric cross-section(s) such that vibrational and/or resonant frequencies produced by the handlebar 36 are synchronized with the human induced vibrational and/or resonant frequencies of the user's arm (e.g., 5-10 Hz).

In one embodiment, different handlebars may be manufactured with different asymmetric cross-section(s) such that vibrational and/or resonant frequencies produced by the handlebar 36 are synchronized with the human induced vibrational and/or resonant frequencies selectable by the intended user. For example, one user might find a handlebar 36 producing vibrational and/or resonant frequencies that are synchronized with the user's hand (e.g., 30-50 Hz) to be preferable, while another user might prefer a handlebar 36 producing vibrational and/or resonant frequencies that are synchronized with the user's arm (e.g., 5-10 Hz) or other human body resonance frequency.

In one embodiment, the handlebar 36 might include different adjustable aspects such as weights, features, or the like such that the vibrational and/or resonant frequencies of handlebar 36 can be modified within a given range to further tune the vibrational and/or resonant frequencies of handlebar 36 to the individual user.

In one embodiment, handlebar 36 configures the asymmetric cross-section(s) such that fore and aft, and side-to-side vibrational and/or resonant frequencies are reduced and/or synchronized with the human induced vibrational and/or resonant frequencies in conjunction with a reduction in aerodynamic drag.

As a result, embodiments of the handlebar 36 comprising at least a portion of asymmetric cross-section(s) are able to reduce and/or change the aerodynamics, vibrations, resonant frequencies, and/or other unwanted effects imparted to the user based on the conditions that the user, vehicle, and/or handlebar 36 is experiencing.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What I claimed is:

1. A handlebar comprising:
   a stem clamp region;
   a plurality of control end regions; and
   a plurality of transition regions, wherein a cross-section of at least a portion of one or more of said plurality of transition regions is asymmetric based on an intersection of four ellipses and defined by four different radii and an axis of symmetry of said ellipses, wherein said four ellipses have a coincident center, wherein said axis of symmetry of said ellipses is offset by an angle ($\alpha$) from a fore-aft plane of said handlebar, wherein said four ellipses are symmetrical across said axis of symmetry of said ellipses.

2. The handlebar of claim 1, wherein said angle ($\alpha$) varies along a length of at least one of said plurality of transition regions.

3. The handlebar of claim 1, wherein said four different radii vary along a length of at least one of said plurality of transition regions.

4. The handlebar of claim 1, wherein a cross-section of at least one of said plurality of control end regions is symmetric.

5. The handlebar of claim 1, wherein a cross-section of said stem clamp region is symmetric.

6. The handlebar of claim 1, wherein a cross-section of at least a portion of one or more of said plurality of control end regions is asymmetric based on said intersection of said plurality of ellipses and defined by said four different radii and said angle ($\alpha$).

7. The handlebar of claim 1, wherein said plurality of transition regions comprises two transition regions, and each of said two transition regions is located between said stem clamp region and said plurality of said control end regions.

8. A handlebar comprising:
   a stem clamp region;
   a plurality of control end regions; and
   a plurality of transition regions, wherein a cross-section of at least a portion of said stem clamp region is asymmetric based on an intersection of four ellipses and defined by four different radii and an axis of symmetry of said ellipses, wherein said four ellipses have a coincident center.

9. The handlebar of claim 8, wherein an angle of said axis of symmetry of said ellipses varies along a length of said stem clamp region.

10. The handlebar of claim 8, wherein said four different radii vary along a length said stem clamp region.

11. The handlebar of claim 8, wherein at least a portion of one or more of said plurality of control end regions and at least a portion of one or more of said plurality of said transition regions is symmetric.

12. The handlebar of claim 8, wherein a cross-section of at least a portion of one or more of said plurality of transition regions is asymmetric based on said intersection of said four ellipses and defined by said four different radii and an angle of said axis of symmetry of said four ellipses.

13. The handlebar of claim 8, wherein a cross-section of at least a portion of one or more of said plurality of control end regions is asymmetric based on said intersection of said four ellipses and defined by said four different radii and an angle of said axis of symmetry of said four ellipses.

14. A handlebar comprising:
    a stem clamp region;
    a plurality of control end regions; and
    a plurality of transition regions, wherein a cross-section of at least a portion of one or more of said plurality of control end regions is asymmetric based on an intersection of four ellipses and defined by four different radii and an axis of symmetry of said ellipses, wherein said four ellipses have a coincident center.

15. The handlebar of claim 14, wherein an angle of said axis of symmetry of said ellipses varies along a length of at least one of said plurality of said control end regions.

16. The handlebar of claim 14, wherein said four different radii vary along a length of at least one of said plurality of control end regions.

17. The handlebar of claim 14, wherein said stem clamp region and at least a portion of one or more of said plurality of said transition regions is symmetric.

18. The handlebar of claim 14, wherein a cross-section of at least a portion of one or more of said plurality of transition regions is asymmetric based on said intersection of said four ellipses and defined by said four different radii and an angle of said axis of symmetry of said four ellipses.

19. The handlebar of claim 14, wherein a cross-section of at least a portion of said stem clamp region is asymmetric based on said intersection of said four ellipses and defined by said four different radii and an angle of said axis of symmetry of said four ellipses.

20. A handlebar for steering a vehicle, said handlebar comprising:
a stem clamp region;
a plurality of control end regions; and
a plurality of transition regions, wherein a cross-section of at least a portion of one or more of said plurality of transition regions is an asymmetric cross-section characterized in that said asymmetric cross-section is based on an intersection of four ellipses and defined by four different radii (R1, R2, R3, R4) and an angle (a) of an axis of symmetry of said ellipses with respect to a horizontal line, wherein said four ellipses have a coincident center.

21. The handlebar of claim 20, wherein a cross-section of at least a portion of said stem clamp region is an asymmetric cross-section characterized in that said asymmetric cross-section is based on an intersection of said four ellipses and defined by said four different radii (RI, R2, R3, R4) and an angle (a) of an axis of symmetry of said ellipses with respect to a horizontal line, wherein said four ellipses have a coincident center.

22. The handlebar of claim 20, wherein at least a portion of said plurality of control end regions is an asymmetric cross-section characterized in that said asymmetric cross-section is based on an intersection of said four ellipses and defined by said four different radii (RI, R2, R3, R4) and an angle (a) of an axis of symmetry of said ellipses with respect to a horizontal line, wherein said four ellipses have a coincident center.

23. The handlebar of claim 20, wherein said different radii comprise a first pair of radii (R1, R2) along said axis of symmetry and a second pair of radii (R3, R4) along a second axis of symmetry perpendicular to said axis of symmetry about said coincident center.

24. The handlebar of claim 20, wherein said axis of symmetry is a major axis of symmetry for each ellipse of said four ellipses.

25. The handlebar of claim 20, wherein said axis of symmetry is a major axis of symmetry for at least two ellipses of said four ellipses.

26. The handlebar of claim 20 wherein none of said different radii are equal.

27. The handlebar of claim 20, wherein said angle (a) of said axis of symmetry of said ellipses varies along a length of at least one of said plurality of transition regions.

28. The handlebar of claim 20, wherein said angle (a) of said axis of symmetry of said ellipses varies along a length of said stem clamp region.

29. The handlebar of claim 20, wherein said angle (a) of said axis of symmetry of said ellipses varies along a length of at least a portion of said plurality of control end regions.

30. The handlebar of claim 20, wherein said four different radii (R1, R2, R3, R4) vary along a length of at least one of said plurality of transition regions.

31. The handlebar of claim 20, wherein said four different radii (R1, R2, R3, R4) vary along a length of said stem clamp region.

32. The handlebar of claim 20, wherein said four different radii (R1, R2, R3, R4) vary along at least a portion of said plurality of control end regions.

33. The handlebar of claim 20, wherein a cross-section of at least a portion of at least one of said plurality of transition regions is substantially symmetric.

34. The handlebar of claim 20, wherein a cross-section of at least a portion of said stem clamp region is substantially symmetric.

35. The handlebar of claim 20, wherein a cross-section of at least a portion of at least one of said plurality of control end regions is substantially symmetric.

36. The handlebar of claim 20, wherein said plurality of transition regions comprises two transition regions, and each of said two transition regions is located between said stem clamp region and one of said plurality of said control end regions.

37. The handlebar of claim 20 wherein, said handlebar is coupled to a vehicle.

38. The handlebar of claim 37 wherein, said vehicle is selected from a group consisting of: a bicycle, an electric bike, an e-bike, a moped, a motorcycle, a snow machine, a personal watercraft, and an aircraft.

* * * * *